United States Patent [19]
Ishii

[11] Patent Number: 5,717,677
[45] Date of Patent: Feb. 10, 1998

[54] DATA ERASURE DEVICE AND DATA RECORDING DEVICE USING A CLOCK SIGNAL

[75] Inventor: Koichiro Ishii, Yokosuka, Japan

[73] Assignee: Nikon Corporation, Tokyo, Japan

[21] Appl. No.: 604,311

[22] Filed: Feb. 21, 1996

[30] Foreign Application Priority Data

Feb. 21, 1995 [JP] Japan ................................. 7-032017

[51] Int. Cl.[6] .................................................. G11B 7/00
[52] U.S. Cl. ...................................... 369/116; 369/124
[58] Field of Search ........................ 369/13, 116, 112, 369/124, 54, 58, 47, 48, 50

[56] References Cited

U.S. PATENT DOCUMENTS 5,469,419  11/1995  Iida et al. ................................. 369/58

FOREIGN PATENT DOCUMENTS

| 0 202 914 | 11/1986 | European Pat. Off. . |
| 0 315 415 | 5/1989 | European Pat. Off. . |
| 0 335 486 | 10/1989 | European Pat. Off. . |
| 0 388 271 | 9/1990 | European Pat. Off. . |
| 2 118 352 | 10/1983 | United Kingdom . |

*Primary Examiner*—P. W. Huber

[57] ABSTRACT

A data erasure device for an optical recording medium which controls the effects of a temperature rise of an optical recording medium during an erasure operation. The data erasure device irradiates a light beam on a recording medium, and erases data recorded on the medium by increasing the temperature of a portion of the recording medium irradiated by the light beam. The light beam is caused to blink between two states during the erasure operation to produce a uniform erasure mark.

10 Claims, 4 Drawing Sheets

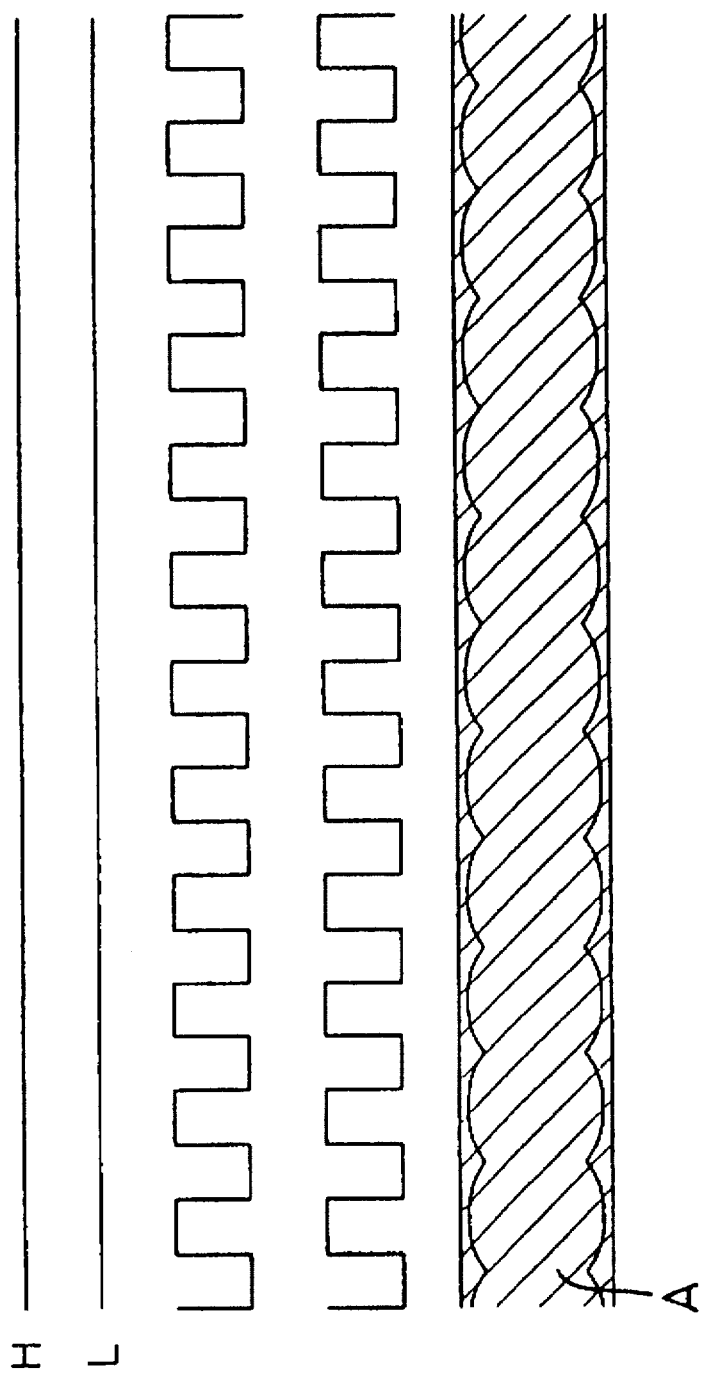

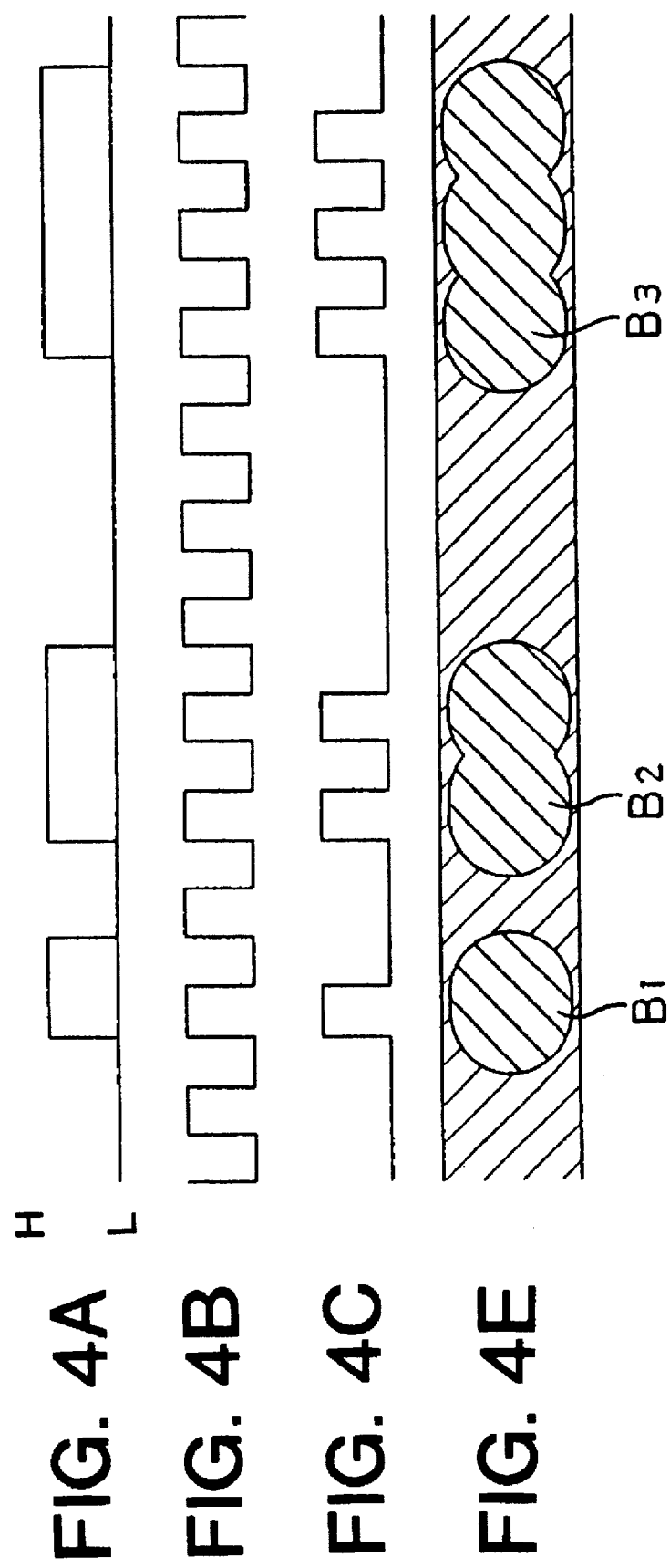

DATA ERASURE DEVICE AND DATA RECORDING DEVICE USING A CLOCK SIGNAL

BACKGROUND OF THE INVENTION

1. Field of the Invention

The present invention relates to a device for recording and erasing data recorded on an optical recording medium.

2. Description of the Related Art

When recording data onto an optical recording medium, a light spot is radiated onto the medium causing marks to be formed on the medium. The light spot and the medium are then caused to move relatively. Generally, when forming a mark of predetermined length, the light spot is radiated for a predetermined period. A mark is formed by a rise in temperature of the spot on the recording surface of the medium being irradiated by the light spot. However, because the recording surface has a time constant of heating, there is a delay in the temperature rise (or temperature fall) of the recording medium with respect to the timing of the irradiation (or the timing of the shutoff of the radiation) of the spot. Furthermore, due to the length and peripheral temperature of the record mark, there are differences in the way in which the temperature rises and temperature falls in the recording surface. Namely, according to various conditions, there are differences in the way the mark forms, specifically in thickness and length.

Japanese Laid-Open Patent Publication JP-A-2-239429 discloses an optical recording device which attempts to eliminate the influence of the time constant of heating by blinking the light source during formation of the mark. However, in a rewriteable recording medium, such as an optomagnetic disk, it is sometimes necessary to erase previously recorded data, from a given region of the recording medium, before recording on that region, for example, when recording data on an optomagnetic recording medium using optical modulation.

During an erasing operation, a beam, having an intensity greater than a predetermined value, is irradiated onto the medium. The direction of perpendicular magnetization of the recording surface of the medium is made uniform in a constant direction (upward or downward). During erasure, in the case of continuously irradiating a beam of constant intensity, the temperature of the recording surface rises gradually. This temperature rise leads to erasure not only in the track, but in adjacent tracks. As a result, data recorded on an adjacent track may be erased.

SUMMARY OF THE INVENTION

Accordingly, it is an object of the present invention to provide a data erasure and recording device which reduces the effects of the temperature rise of the medium during erasure.

It is also an object of the present invention to provide a data erasure and recording device in which a light beam is caused to blink during the erasure operation, such that an unnecessary temperature rise of the recording surface during recording can be suppressed.

Additional objects and advantages of the invention will be set forth in part in the description which follows, and, in part, will be obvious from the description, or may be learned by practice of the invention.

Objects of the present invention are achieved in a data erasure device which radiates a light beam onto a recording medium surface, and erases data which has been recorded on the medium surface by an increase in temperature of a radiation portion of the light beam on the medium, wherein the beam is caused to blink during erasure.

Objects of the present invention are also achieved in a data recording device equipped with irradiation means for irradiating a light beam onto a recording medium, control means for controlling the intensity of the light beam according to input signals, erasure signal generation means for outputting a pulse signal of a predetermined frequency, with respect to the control means, during erasure of the data recorded on the recording medium, and recording signal generation means for outputting recording signals, with respect to the control means, during recording of data in a portion of the recording medium from which data has been erased.

Objects of the present invention are achieved in a data erasure device comprising a light beam generation unit which erases data recorded on a recording medium by radiating a blinking light beam onto the recording medium so as to increase the temperature of a radiation portion of the light beam on the medium.

Objects of the present invention are also achieved in a data recording device comprising an irradiation unit which radiates a light beam onto a recording medium, a control unit which controls the intensity of the light beam between at least two values, according to an input signal, an erasure signal generation unit which outputs a pulse erasure signal of a predetermined frequency as the input signal to the control unit during erasure of the data recorded on the recording medium, and a recording signal generation unit which outputs recording signals as the input signal to the control unit during recording of data.

Objects of the present invention are also achieved in a method of erasing an optomagnetic disk comprising irradiating a portion of the optomagnetic disk with a laser at a first intensity which allows a change of a direction of magnetization of the portion, magnetizing the portion in a specified direction, and causing the laser to cycle between the first intensity and a second intensity which does not allow a change of the direction of magnetization of the portion.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 3A–3D are diagrams of signals during an erasure operation, and the resultant recording marks, in a data recording device according to the preferred embodiment of the present invention.

FIGS. 4A–4D are diagrams of signals during a writing operation, and the resultant recording marks, in a data recording device according to the preferred embodiment of the present invention.

DESCRIPTION OF THE PREFERRED EMBODIMENT

Figure 1:
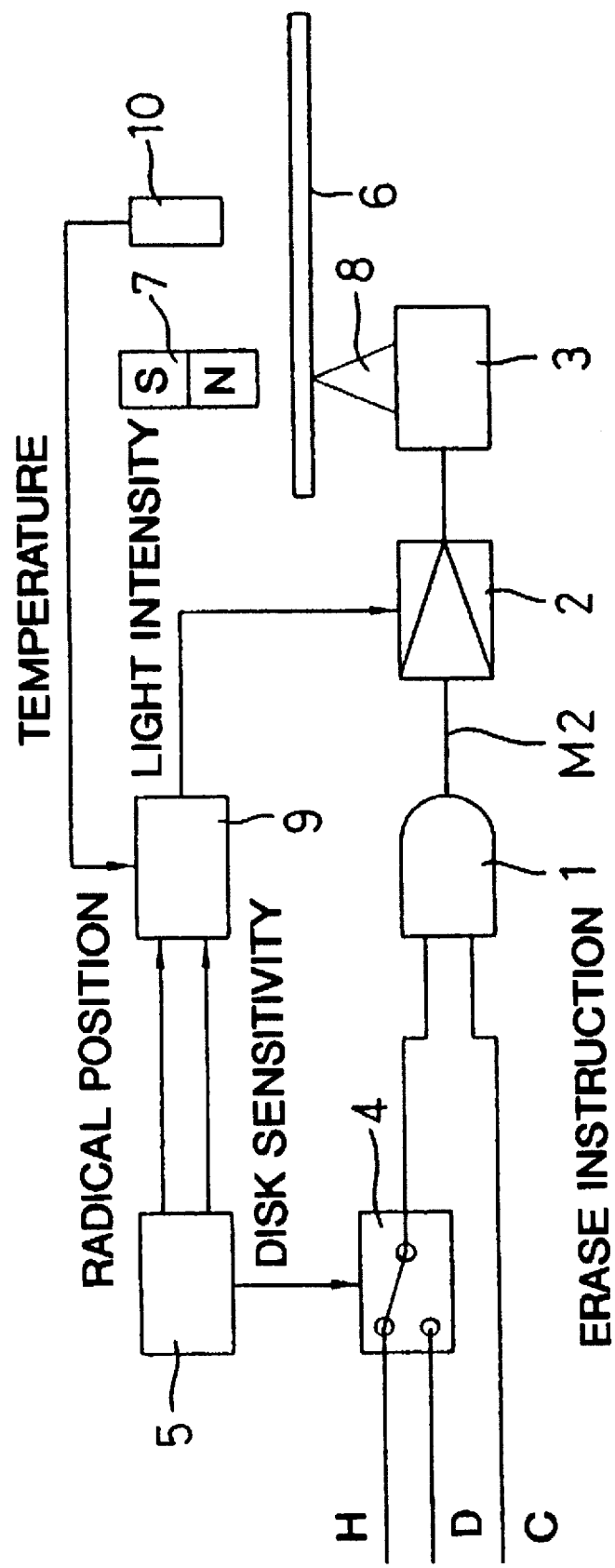
FIG. 1 is a block diagram of a data recording device during an erasure operation according to a preferred embodiment of the present invention.

Reference will now be made in detail to the present preferred embodiment of the present invention, examples of which are illustrated in the accompanying drawings, wherein like reference numerals refer to like elements throughout.

Figure 2:
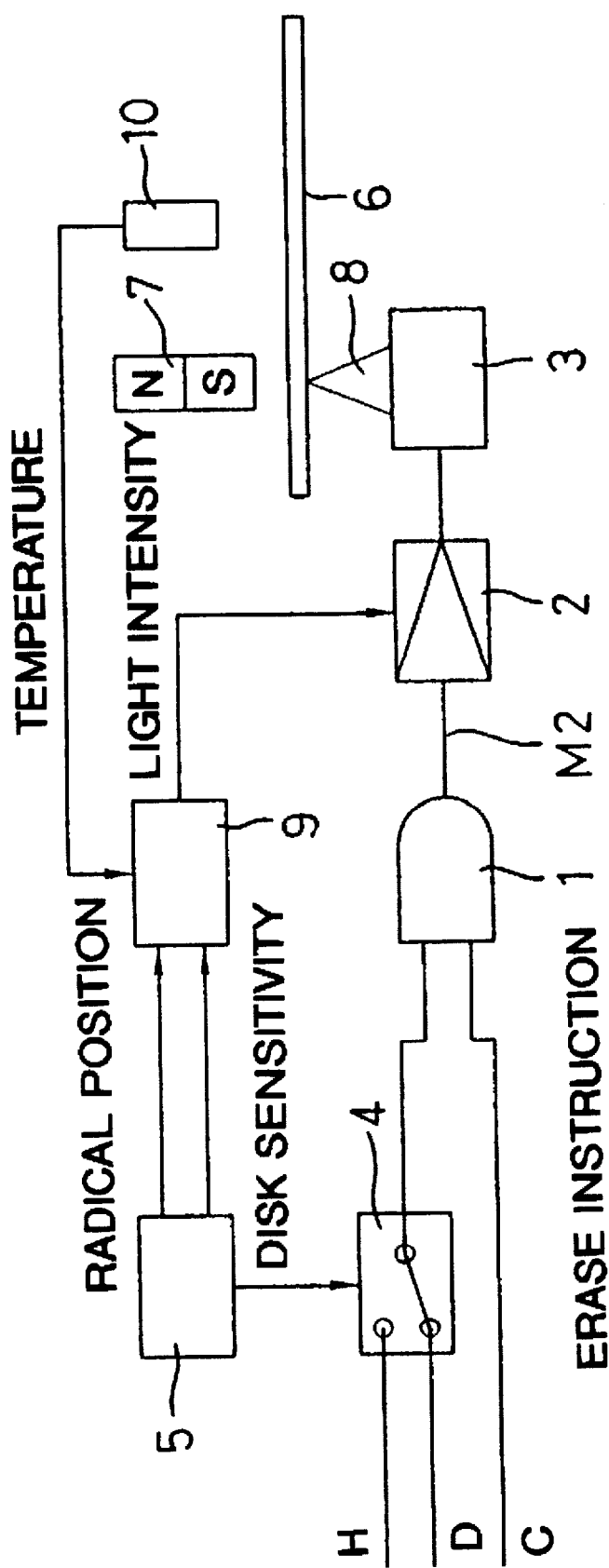
FIG. 2 is a block diagram of a data recording device during a writing operation according to the preferred embodiment of the present invention.
Figure 1:
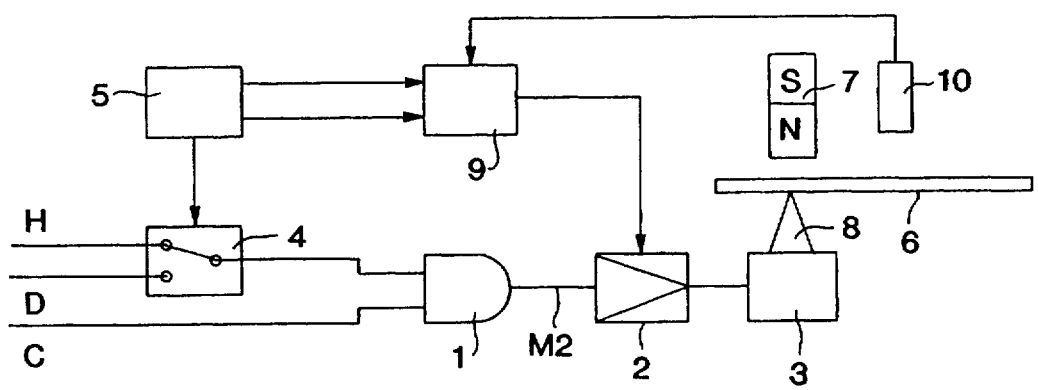
Figure 2:
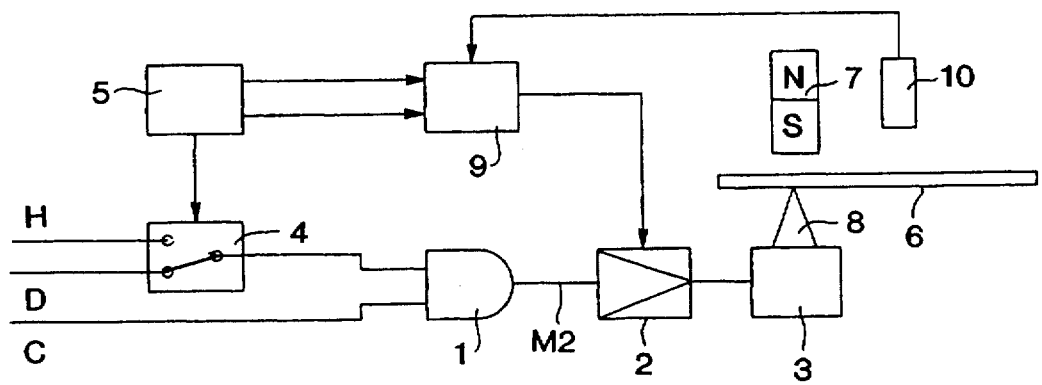

FIG. 1 is a block diagram of a data recording device during an erasure operation according to a preferred embodiment of the present invention. FIG. 2 is a block diagram of a data recording device during a writing operation according to the preferred embodiment of the present invention. In FIGS. 1 and 2, a clock signal C is input to an input terminal of an AND circuit 1. A data signal D or a signal H, as selected by a switch 4, is input to the other input terminal of the AND circuit 1. Control of the switch 4 is performed by a controller 5. When a signal H is selected (see FIG. 1), the data recording device performs an erasure operation. Conversely, when a data signal D is selected (see FIG. 2), the data recording device performs a writing operation. The AND circuit 1 outputs the logical product signal of the two input signals. The signal is called the light source modulation signal M2.

The light source modulation signal M2 output from the AND circuit 1 is amplified by a light source driver 2 and passed to a laser head 3. The laser head 3 emits an irradiating laser light 8. The laser light 8 has two values, set according to the light source modulation signal M2. The laser light 8 irradiates an optomagnetic disk 6. The optomagnetic disk 6 revolves, such as by a spindle motor not shown in the drawings. The irradiation position of the laser light on the optomagnetic disk 6 can be changed in a track direction. By performing tracking control and focusing control, the laser light 8 is focused on and continuously irradiates a predetermined track of the optomagnetic disk. The irradiation causes the temperature of the recording layer of the optomagnetic disk 6 to rise and the retention force of the irradiated portion decreases. The irradiated portion is magnetized in the magnetic field direction effected by a magnetic field generation device 7.

The emission intensity of the laser light 8 is based on two values, and varies between a high and a low intensity. The high intensity is above the degree which can cause a change of the direction of magnetization of the recording layer. The low intensity is below a degree which cannot cause a change of the direction of magnetization of the recording layer. The intensity of the laser light changes according to the sensitivity of the disk, the temperature of the disk, the radial position on the disk, and the like.

Radial position data and sensitivity data are sent to a light intensity calculation unit 9 from the controller 5. Temperature data is sent to the light intensity calculation unit 9 from a temperature sensor 10, located near the disk 6, which senses the temperature of the disk 6. As can be appreciated, various types of temperature sensors and sensor locations modifications can be made to obtain the necessary temperature data. The light intensity calculation unit 9 calculates light intensity and transmits the light intensity to the light source driver 2.

FIGS. 3A–3D are diagrams of signals during an erasure operation, and the resultant recording marks, in a data recording device according to the preferred embodiment of the present invention. FIGS. 4A–4D are diagrams of signals during a writing operation, and the resultant recording marks, in a data recording device according to the preferred embodiment of the present invention. In general, an erasure operation is performed on the data recorded in a region on the disk 6 to be used for recording (termed "erasure operation" below). Similarly, data is written to a region which has been erased (termed "writing operation" below).

To initiate an erasure operation, the controller 5 outputs an erasure instruction signal which causes the switch 4 to select the signal H. As a result, the signal H is input to the input terminal on one side of the AND circuit 1. The clock signal C is input to the other terminal of the AND circuit 1. FIG. 3A shows the waveform of the signal H. FIG. 3B shows the waveform of the clock signal C. The signal H provides a continuous signal whose level varies between two values: a low level (designated as "L" in FIG. 3A), and an high level (designated as "H" in FIG. 3A). FIG. 3C shows the light source modulation signal M2 output from the AND circuit 1. The waveform is similar to that of the clock signal C.

The light source modulation signal M2 is sent, via the light source driver 2, to the laser head 3. The intensity of the laser light 8 emitted from the laser head 3 changes according to the level of the light source modulation signal M2. Here, when the light source modulation signal M2 is at the high (H) level, the laser light 8 is caused to emit with a high intensity, i.e., such that the magnetization of the recording layer can be changed. When the light source modulation signal M2 is at the low (L) level, the laser light 8 is caused to emit with a low intensity, i.e., such that the magnetization of the recording layer cannot be changed. The magnetic field generation device 7, as shown in FIG. 1, positions an N pole towards the disk 6. The magnetic field is impressed from above to below with respect to the disk surface.

FIG. 3D shows the record mark shape formed on the optomagnetic disk 6. When the laser light 8 is emitted, with high intensity, the mark A begins to be formed. The direction of magnetization is in the same direction as the magnetic field impressed by the magnetic field generation device 7. Because the temperature on the disk surface gradually rises, the mark A gradually becomes wide. When the intensity of the laser light 8 becomes weak or low, the temperature on the disk surface begins to fall, and the mark A gradually becomes narrow. The mark A does not become too wide or too narrow due to the repeated modulation of the light source modulation signal M2 and the direction of magnetization is kept in a uniform direction.

During the writing operation, marks are formed on the optomagnetic disk 6, according to data signals D, in a region on which erasure was previously performed. The controller 5 outputs a writing instruction signal. Based on this signal, the switch 4 selects the data signal D. As a result, the data signal D is input to the input terminal of the AND circuit 1. The clock signal C is input to the other terminal of the AND circuit 1. FIG. 4A shows the waveform of the data signal D. FIG. 4B shows the waveform of the clock signal C. FIG. 4C shows the light source modulation signal M2 output from the AND circuit 1.

The light source modulation signal M2 is sent, via the light source driver 2, to the laser head 3. Laser light 8 from the laser head 3 is emitted according to the level of the light source modulation signal M2. When the light source modulation signal M2 is at the high level, the laser light 8 is caused to emit with a high intensity. When the light source modulation signal M2 is at the low level, the laser light 8 is caused to emit with a low intensity. The magnetic field generation device 7 positions an S pole towards the disk 6. In this case, the magnetic field is impressed from below to above with respect to the disk surface. Thus, the generation of a magnetic field is carried out with a direction which is the opposite direction of the magnetic field generated during erasure.

FIG. 4D shows the shape of the record marks formed on the optomagnetic disk 6. Three kinds of marks, B1, B2 and B3, are shown. When the laser light 8 is emitted with a high intensity a mark begins to be formed; Because the direction of the magnetic field is in the same direction as the direction of the magnetic field impressed by the magnetic field generation device, it becomes opposite to the direction of magnetization of the mark formed during the erasure operation. Because the temperature on the disk surface gradually increases, the mark gradually becomes wide. When the intensity of the laser light 8 becomes weak, the temperature on the disk surface begins to fall, and the mark gradually becomes narrow. Mark formation is similar for each of the marks B1, B2 and B3. Marks B2 and B3 are longer than mark B1, but even in the case of formation of such long marks, the mark does not become too wide or too narrow. The marks are written with a direction of magnetization opposite to the erasure direction.

Although a preferred embodiment of the present invention has been shown and described, it would be appreciated by those skilled in the art that changes may be made in the embodiment without departing from the principles and spirit of the invention, the scope of which is defined in the claims and their equivalents.

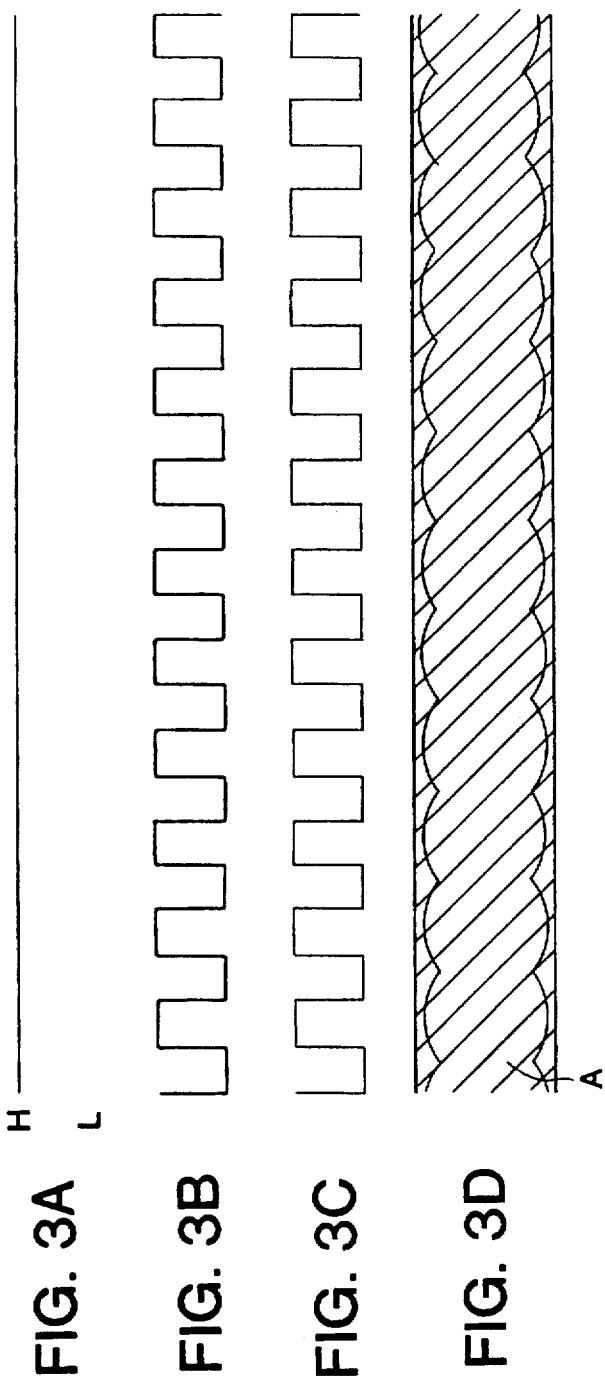

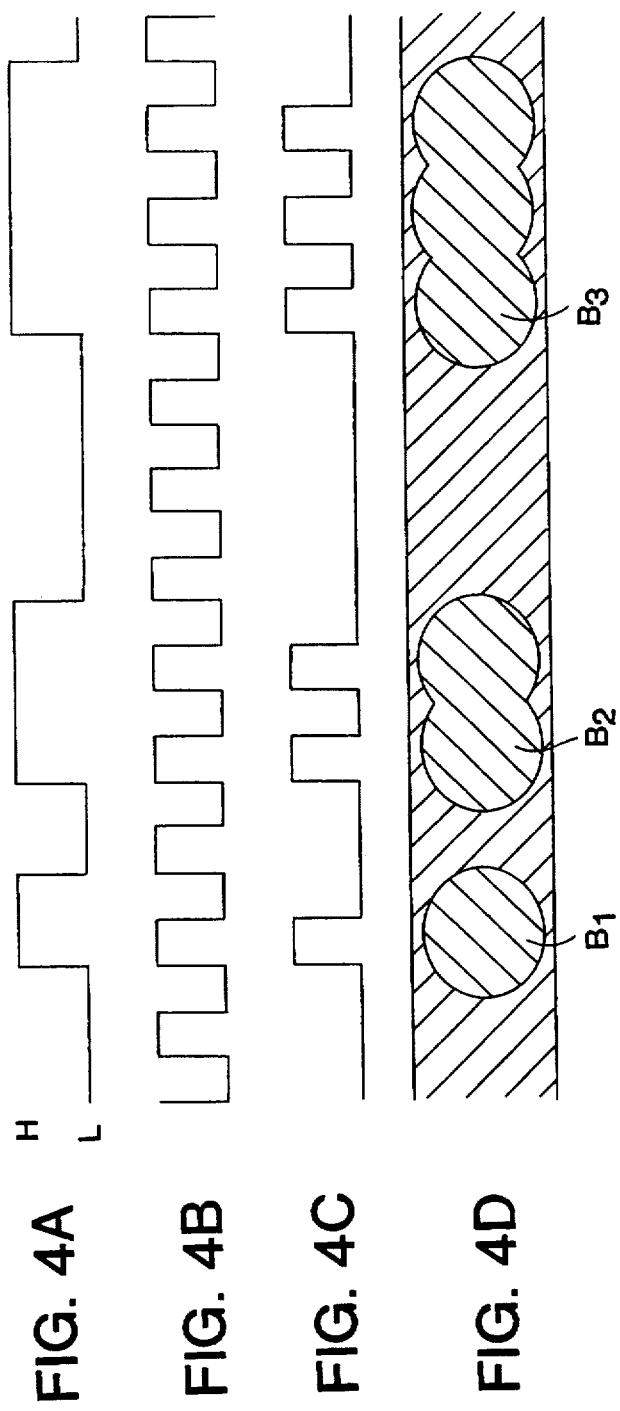

What is claimed is:

1. A data recording device comprising:

a clock signal generator outputting a clock signal having a predetermined frequency;

an irradiation unit which radiates a light beam onto a recording medium;

a control unit which controls the intensity of the light beam between at least two values, according to an input signal;

an erasure signal generation unit which outputs a erasure signal for erasure of the data recorded on the recording medium;

a recording signal generation unit which outputs recording signals for recording of data; and an and circuit which ands the clock signal and one of the erasure signals and recording signals to produce the input signal.

2. A data recording device, as set forth in claim 1, wherein the at least two values comprises a first value which produces a high intensity light beam which can cause a change in the direction of magnetization of the recording medium and a second value which produces a low intensity light beam which can not cause a change in the direction of magnetization of the recording medium.

3. A data recording device, as set forth in claim 1, further comprising:

a switch unit which selects one of the erasure signals and recording signals as the input signal to the and circuit.

4. A data recording device, as set forth in claim 1, further comprising:

a temperature sensor which senses a temperature on the recording medium during the erasure and recording.

5. A data recording device, as set forth in claim 1, further comprising:

a magnetic field generation device which determines a direction of a magnetic field imposed on the recording medium during erasure and recording.

6. A data recording device, as set forth in claim 5, wherein the direction of the magnetic field imposed during erasure is different than the magnetic field imposed during recording.

7. A data recording device, as set forth in claim 6, wherein the direction of the magnetic field imposed during erasure is opposite the direction of magnetic field imposed during recording.

8. A data recording device, as set forth in claim 5, wherein the direction of the perpendicular magnetization of the recording medium is made uniform in a constant direction during erasure of the data recorded on the recording medium.

9. A data recording device, as set forth in claim 1, wherein the recording medium is an optomagnetic disk.

10. A method of writing to an optomagnetic disk comprising:

generating a clock signal;

anding the clock signal with one of an erasure signal, which allows a change of direction of magnetization of the optomagnetic disk, and a recording signal to produce an input signal;

irradiating a portion of the optomagnetic disk with a laser which varies intensity based on the input signal; and if erasing, magnetizing the portion in a specified direction.

* * * * *

UNITED STATES PATENT AND TRADEMARK OFFICE
CERTIFICATE OF CORRECTION

PATENT NO.: 5,717,677
DATED : February 10, 1998
INVENTOR(S): Koichiro Ishii

It is certified that error appears in the above-identified patent and that said Letters Patent is hereby corrected as shown below:

Please delete drawing sheets 1, 2, 3A & 4A, and substitute drawings sheets 1, 2, 3A & 4A as per attached.

The Title page showing the illustrative figure should be deleted to be replaced with the attached title page.

Signed and Sealed this

Twenty-eighth Day of December, 1999

Attest:

Q. TODD DICKINSON

Attesting Officer      Acting Commissioner of Patents and Trademarks

United States Patent [19]

Ishii

[11] Patent Number: 5,717,677
[45] Date of Patent: Feb. 10, 1998

[54] DATA ERASURE DEVICE AND DATA RECORDING DEVICE USING A CLOCK SIGNAL

[75] Inventor: Koichiro Ishii, Yokosuka, Japan

[73] Assignee: Nikon Corporation, Tokyo, Japan

[21] Appl. No.: 604,311

[22] Filed: Feb. 21, 1996

[30] Foreign Application Priority Data

Feb. 21, 1995 [JP] Japan ................... 7-032017

[51] Int. Cl.[6] ........................................... G11B 7/00
[52] U.S. Cl. ................................. 369/116; 369/124
[58] Field of Search ........................ 369/13, 116, 112, 369/124, 54, 58, 47, 48, 50

[56] References Cited

U.S. PATENT DOCUMENTS 5,469,419  11/1995  Iida et al. ................... 369/58

FOREIGN PATENT DOCUMENTS

| 0 202 914 | 11/1986 | European Pat. Off. . |
| 0 315 415 | 5/1989 | European Pat. Off. . |
| 0 335 486 | 10/1989 | European Pat. Off. . |
| 0 388 271 | 9/1990 | European Pat. Off. . |
| 2 118 352 | 10/1983 | United Kingdom . |

Primary Examiner—P. W. Huber

[57] ABSTRACT

A data erasure device for an optical recording medium which controls the effects of a temperature rise of an optical recording medium during an erasure operation. The data erasure device irradiates a light beam on a recording medium, and erases data recorded on the medium by increasing the temperature of a portion of the recording medium irradiated by the light beam. The light beam is caused to blink between two states during the erasure operation to produce a uniform erasure mark.

10 Claims, 3 Drawing Sheets

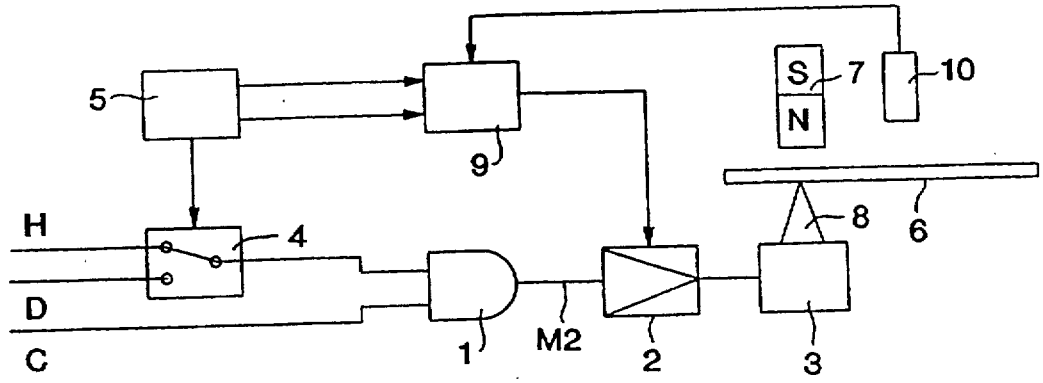

FIG. 1